United States Patent [19]

Yes

[11] Patent Number: 4,744,897
[45] Date of Patent: May 17, 1988

[54] SWEEPER TYPE APPARATUS FOR CLEARING THE DEPOSITION FORMED ON THE BOTTOM OF A POND

[76] Inventor: Johnson Yes, No. 9, She Tze Street, Shin Lin District, Taipei, Taiwan

[21] Appl. No.: 935,435

[22] Filed: Nov. 26, 1986

[51] Int. Cl.⁴ .............................................. B01D 35/02
[52] U.S. Cl. ................................... 210/170; 210/277; 210/460
[58] Field of Search .................... 15/1.7; 210/277, 459, 210/460, 241, 169, 170

[56] References Cited

U.S. PATENT DOCUMENTS 1,506,652  8/1924  Maker .............................. 210/459 X
3,493,116  2/1970  Edmiston ......................... 210/277 X Primary Examiner—Frank Spear
Attorney, Agent, or Firm—Cushman, Darby & Cushman

[57] ABSTRACT

An apparatus for clearing the deposition formed on the bottom of a pond comprises a filter device for filtering the deposition, a suction water tube provided in the filter device with a plurality of suction pipes radially connected to one end thereof and capable of swiveling along with the suction water tube, and a plurality of pipings to connect the water suction tube to the filter device. There are suction inlets formed on the suction pipes for aspirating the pond water which is then fed into the filter device through the pipings and filtered therein. There is also provided a driving mechanism for actuating the water suction tube together with those suction pipes connected thereto to slowly swivel in the water of the pond. The water in the culturing pond will be cleaned from time to time so as to provide a good water quality for the culturing of the fishes in the pond.

7 Claims, 3 Drawing Sheets

SWEEPER TYPE APPARATUS FOR CLEARING THE DEPOSITION FORMED ON THE BOTTOM OF A POND

BACKGROUND OF THE INVENTION

1. Field of the Invention

The present invention relates to an apparatus for taking out the deposition that has settled on the bottom of a pond.

2. Description of the Prior Art

A conventional culturing pond for fishes has a soft mud bottom. It is easily understood that depositions are formed on the bottom of the pond very quickly and can not be removed. As a result, the pond water becomes polluted because of the generation of poisonous gases such as nitrogen and ammonia. This will affect the survival of the fishes.

Recently, people have started to build a culturing pond with a hard bottom. This is achieved by applying a concrete pond bottom structure. However, there are still several disadvantages which are stated hereinbelow.

(1) Although these types of ponds can be equipped with a drain for taking the dirty water from the pond, the main disadvantage is that fishes will always flow away together with the water.

(2) A large quantity of fresh water must be added from time to time. This causes increase in the total cost in the fedding of the fishes.

(3) While the bottom of the pond can be cleared, the rest of the areas remain full of deposition.

(4) It is difficult to determine when the cleaning work should be carried out.

SUMMARY OF THE INVENTION

It is therefor the main object of the present invention to provide an apparatus for clearing the deposition on the bottom of the pond so that the pond water can be remain clean and good for the feeding of the fishes.

The main feature of the present invention is to provide a filtering device which will filter the water that is in the pond. The filtering device can collect the deposition and accumulate a certain amount of it before discharging the same.

Another feature of the present invention is to provide a plurality of sweeper-type water suction pipes that will swivel under the water to collect the deposition from a large area through the suction pipes.

Another important object of the present invention is to provide a cleaning apparatus with a filtering device that makes it possible for the filtered water to be directed back to the pond again for further use.

Accordingly the apparatus for clearing the deposition on the bottom of a culturing pond comprises a filtering means for filtering the pond water, a suction water tube passing through said filtering means and being able to swivel, a plurality of suction means connected to said suction water tube for aspirating water from the pond, a driving means provided on the filtering means for actuating said suction water tube to swivel, and a plurality of pipings and control valves to connect said suction water tube to said filtering means; thereby the pond water together with the deposition can be filtered within said filtering means.

BRIEF DESCRIPTION OF THE DRAWINGS

Those and other objects, features and advantages will become apparent from the following detailed description of the preferred embodiment with reference to the accompanying drawings, wherein.

DETAILED DESCRIPTION OF THE PREFERRED EMBODIMENT

Figure 1:
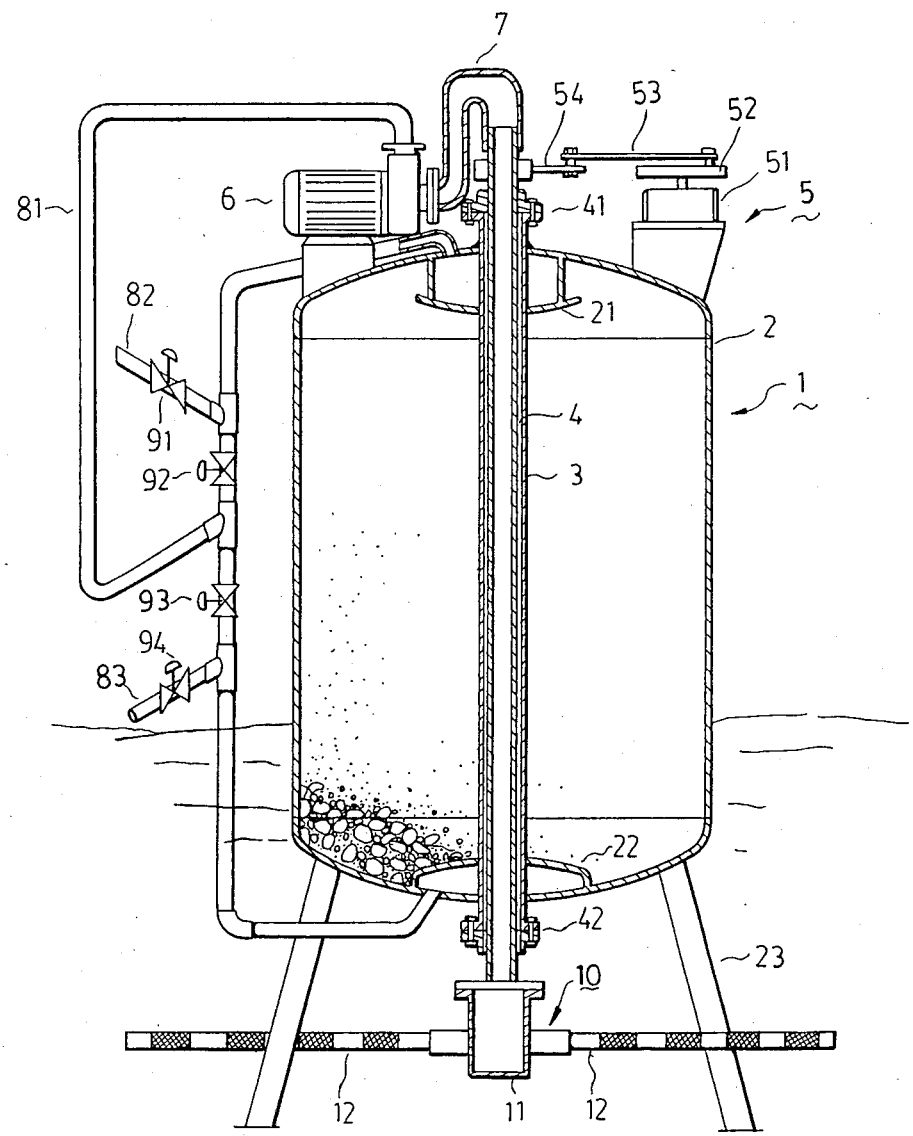
FIG. 1 is a vertical sectional view of the filtering device together with illustrative views of other parts of the apparatus of the present invention.

Referring to FIG. 1, which shows an illustrative view of the apparatus according to the present invention, the whole apparatus includes a filter device 1 which has a central through bore 3 formed in a cylinder 2 of the filter device 1, and a suction water tub 4 sleeved in said through bore 3 with bearings 41 and 42 fitted at the top and bottom portion of the through bore 3 so that the tube 4 can swivel in the through bore 3. There are two buffer plates 21 and 22 formed in the cylinder 2 of the filter device 1 to decelerate the speed of the incoming pond water.

A driving mechanism 5 is provided in the apparatus which includes a motor 51 installed on the cylinder 2 of the filter device 1, an eccentric turn plate 52 connected to the output shaft of the motor 51, a lever 53 with one end thereof connected to the plate 52, and a flange 54 attached to the suction water tube 4 having one end thereof connected to the other end of the lever 53. Therefore, the motor 51 will actuate in turn the suction water tube 4 to reciprocate to swivel in the through bore 3 of the filter device 1.

A pump 6 is also provided in the apparatus which includes a pump body 6 installed on the cylinder 2 of the filter device 1. There is a flexible pipe connector 7 for connecting the suction water tube 4 to the pump 6. There are other pipings 81, 82, 83 and control valves 91, 92, 93 94 equipped for connecting the suction water tube 4 to and filter cylinder 2 and regulate the water flow direction of the pond water.

There is a suction device 10 provided at the bottom portion of the cylinder 2 which includes a multi-directional pipe fitting 11 and three sets of suction pipes 12 distributed radially with 120 separated with respect to each other. The suction pipes 12 is arranged between the support 23 of the cylinder 2 of the filter device 1.

Figure 2:
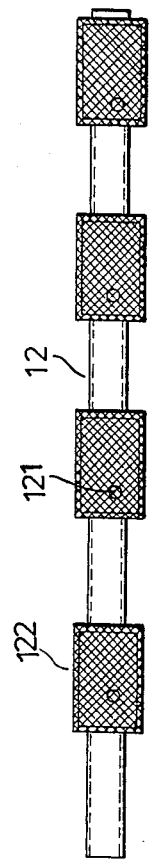
FIG. 2 is a front elevation of the suction means used in the clearing apparatus according to the present invention.
Figure 3:
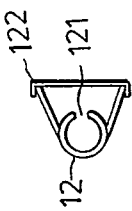
FIG. 3 is a sectional view of the suction means used in the apparatus of the present invention.

Referring to FIG. 2 with reference to FIG. 3, there are a plurality of suction inlets 121 formed on the suction pipes 12 each having a covering mesh 122 attached thereto. The aperture of the mesh 122 is smaller than the offspring fish which ususlly have a length of 8-10 mm. Since the deposition or mud on the bottom of the pond usually has a thickness of about 0.1 mm, the drain of pond water will not effect losses of the offspring fishes. In addition, the mesh 122 serves to even the suction vacuum around the suction inlets 121.

Figure 4:
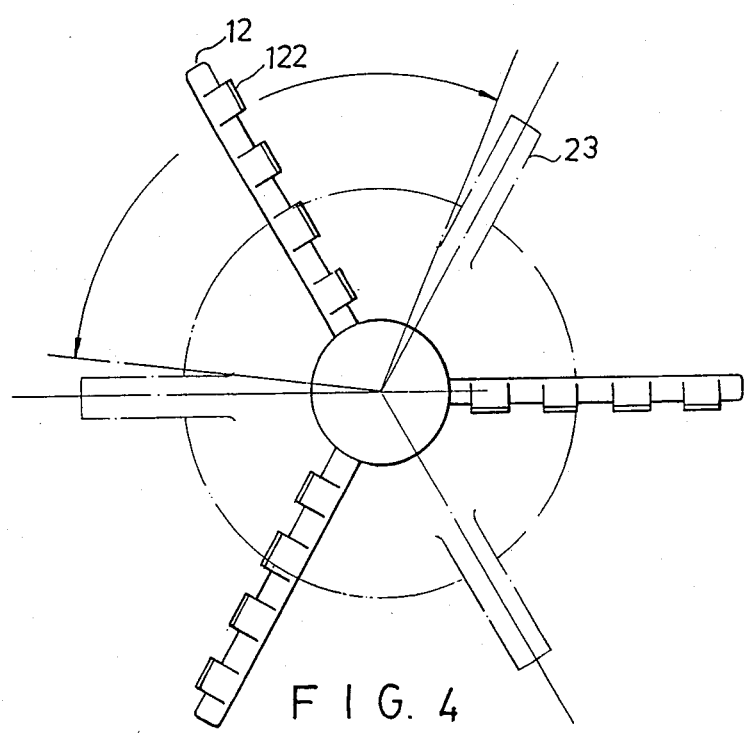
FIG. 4 is an illustrative drawing showing the swivel of the suction means above the bottom of the pond.
Figure 5:
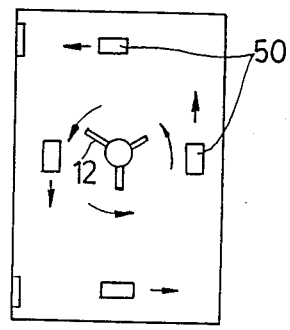
FIG. 5 is another illustrative drawing showing the arrangement of the water pumps and the clearing apparatus of the present invention in a pond.

Referring to FIG. 4, it is easy to appreciate that the three sets of suction pipes 12 are distributed evenly on the bottom of the pond. Referring to FIG. 5, a plurality of water pumps 50 are arranged in cooperation with the apparatus of the present invention. Those pumps 50 will cause the pond water to form a circulation in a defined direction like that shown by arrows, and this will aid the clearing effect of the apparatus according to the present invention.

In operation, we first close control valves 91 and 93 and leave control valves 92 and 94 to be open. The motor 51 is started in order to actuate the suction water tube 4 together with its associated suction pipes 12 to swivel in the pond water. The pump 6 is also started to suck the pond water from the suction inlets 121 into the cylinder 2 of the filter device 1 through suction water tube 4, pipe connector 7, piping 81 and control valve 92. The filtered water is discharged out to the pond again through valve 94 and piping 83.

After the filtering operating has been operated for a long time, the efficiency of the filter device must be decreased due to the accumulation of the depositions contained in the cylinder of the filter device. We can easily reverse the water flow direction to clean the inside of the cylinder 2 of the filter device 1. By first closing the valves 92 and 94 and leaving the valves 91 and 93 open, pond waters will be sucked into the cylinder 2 of the filter device 1 in a reversed direction through suction water tube 4, pipe connector 7, piping 81 and valve 93. The water which flushes the cylinder 2 will then drained out through valve 91 and piping 82.

It is understood that the apparatus for clearing the deposition formed on the bottom of the culturing pond of the present invention can operate well enough to complete the clearing function.

Although the apparatus for clearing the deposition formed on the bottom of the pond according to the present invention has been described in way of preferred embodiment, it is to be noticed that other changes, improvements and modifications are still possible without departing the spirit and scope of the present invention.

What is claimed is:

1. An apparatus for clearing the bottom of a culturing pond comprising:
    a filter device having a cylinder body with a through bore provided at a central portion thereof;
    a suction water tube passing through said through bore and arranged so as to be able to swivel within said through bore;
    a plurality of suction means respectively connected to said suction water tube for taking in water from the pond;
    a driving device provided on said cylinder body of said filter device for actuating said suction water tube to swivel; and
    a plurality of pipes connecting said suction water tube to said filter device with control valves provided thereon to regulate the direction of water flow therethrough;
    whereby the pond water is filtered by said filter device to remove deposits therefrom.

2. The apparatus as claimed in claim 1, wherein said suction water tube is a flexible tube.

3. The apparatus is claimed in claim 1 further comprising means for pivotally connecting said suction water tube to said filter device.

4. The apparatus as claimed in claim 1, wherein said driving device includes a motor mounted on the cylinder of the filter device having an output shaft; an eccentric turn plate pivotally connected to said output shaft of the motor; and a lever connecting said turn plate to said suction water tube so as to drive the latter to swivel slowly.

5. The apparatus as claimed in claim 1, wherein said suction means includes a pipe body having a plurality of water suction inlets formed thereon and a pipe fitting for connecting said pipe body to said suction water tube.

6. The apparatus as claimed in claim 5, wherein said pipe body of the suction means further includes a mesh covering said water suction inlets for preventing objects to block said inlets.

7. The apparatus as claimed in claim 5, wherein said pipe body of the suction means is arranged above the bottom of the pond without contacting the same for effectively carrying out the water intaking operation.

* * * * *